Figure 5:
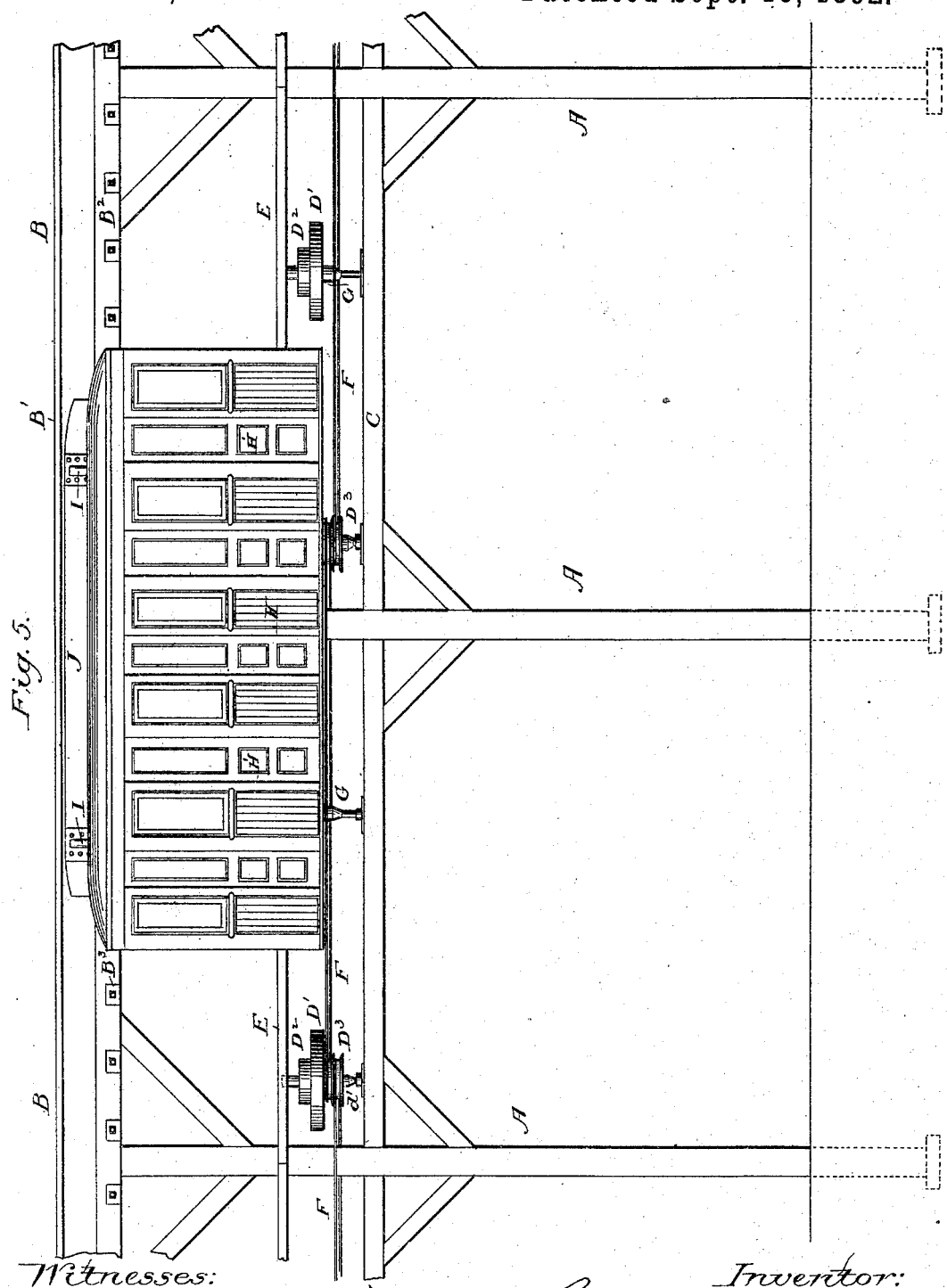

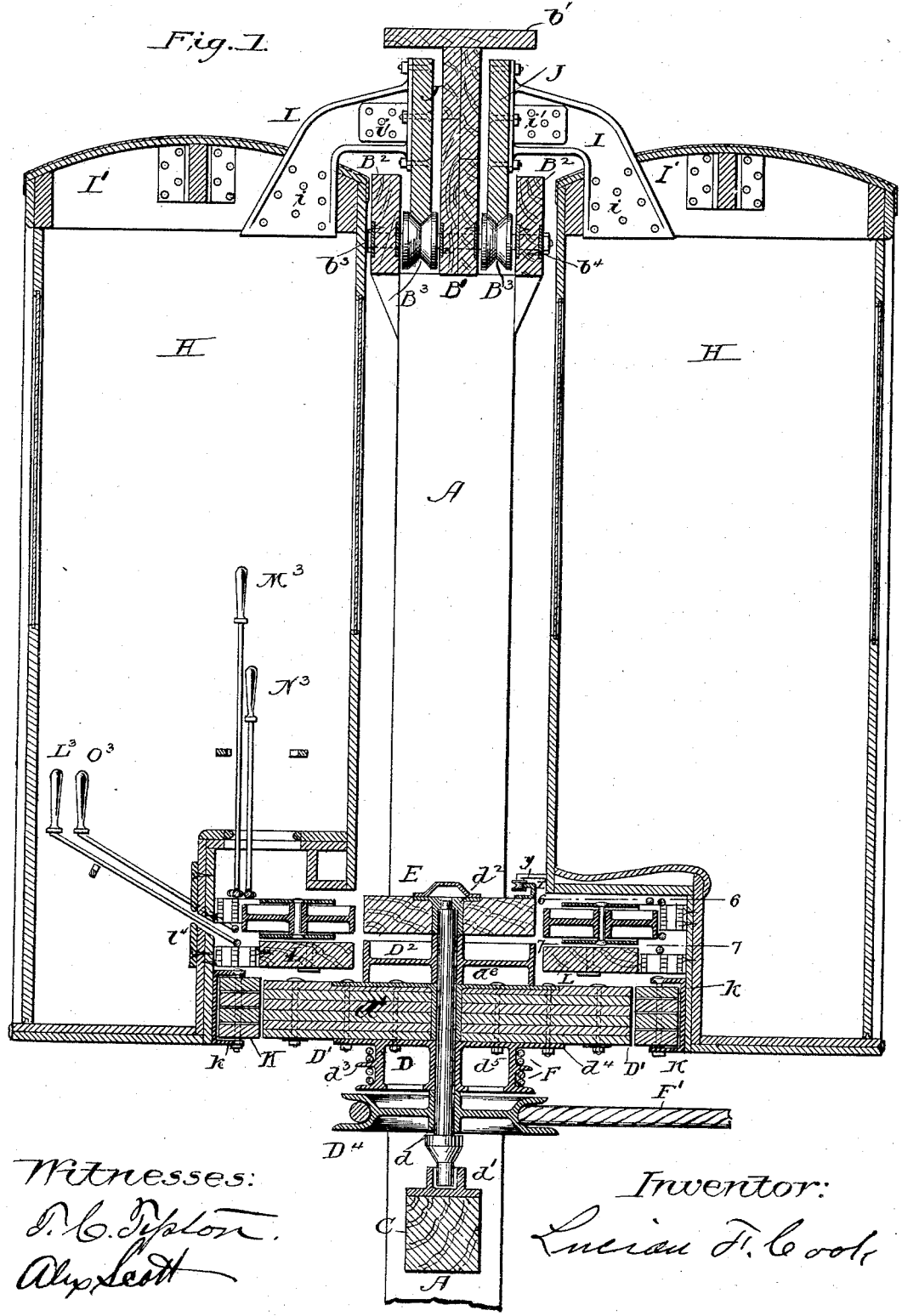

(No Model.) 7 Sheets—Sheet 2.
L. F. COOK.
TRANSPORTATION SYSTEM.
No. 482,469. Patented Sept. 13, 1892.
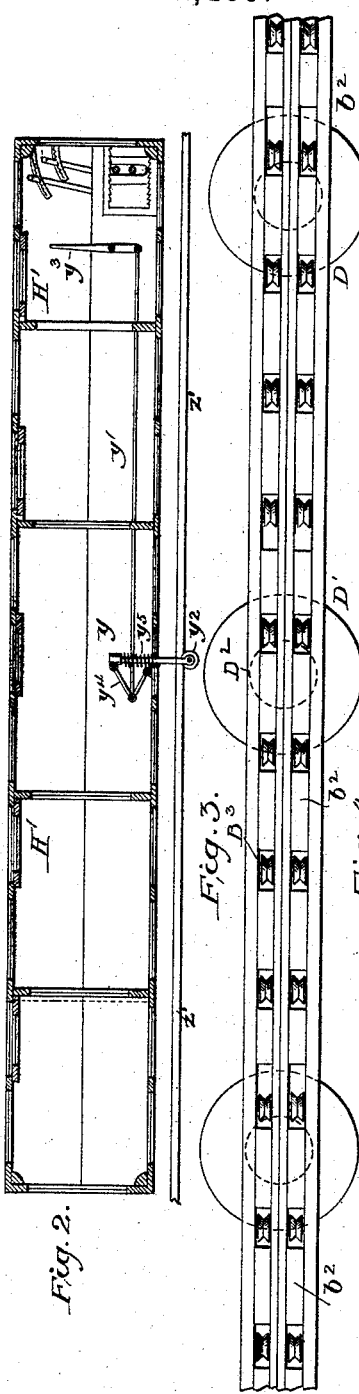
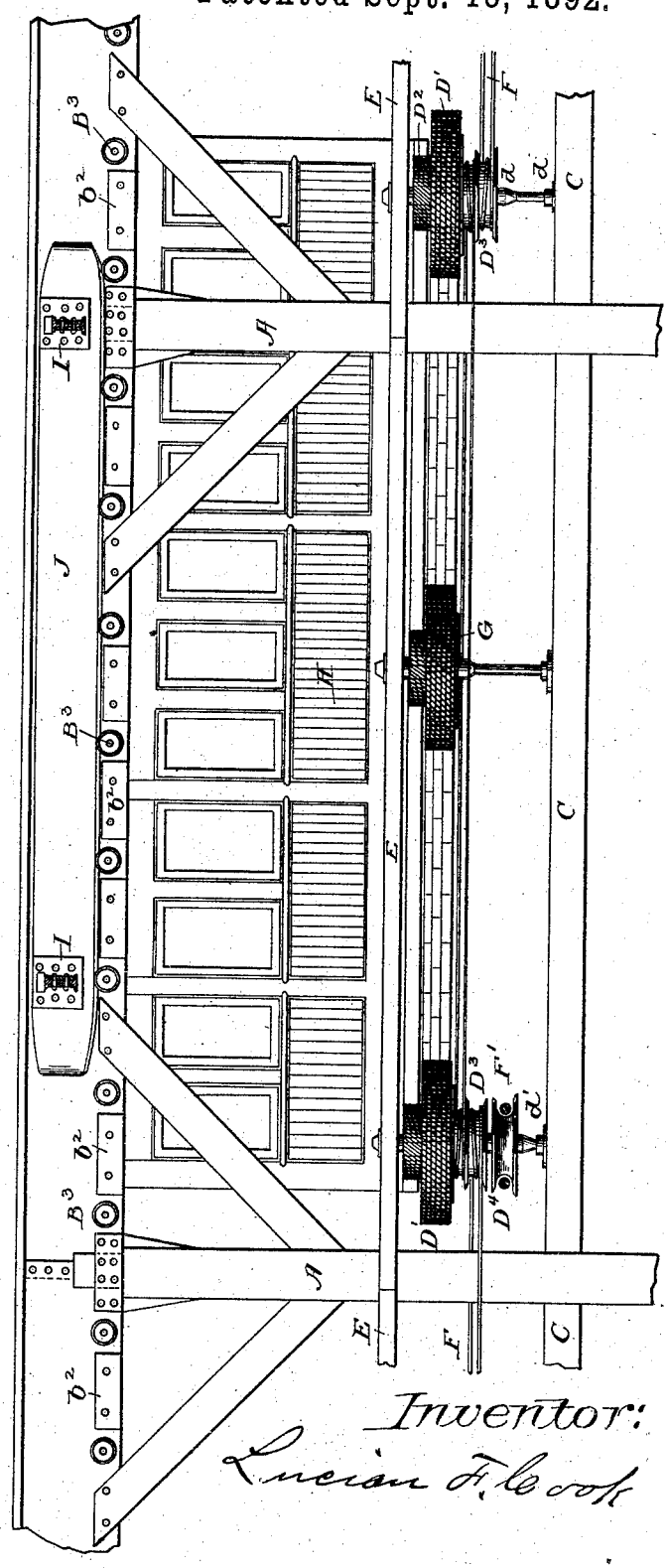
Witnesses:
Inventor:
Lucian F. Cook (No Model.) 7 Sheets—Sheet 3.

L. F. COOK.
TRANSPORTATION SYSTEM.

No. 482,469. Patented Sept. 13, 1892.

Witnesses:
T. C. Tipton
Alx. Scott

Inventor:
Lucian F. Cook (No Model.) 7 Sheets—Sheet 4.
L. F. COOK.
TRANSPORTATION SYSTEM.
No. 482,469. Patented Sept. 13, 1892.
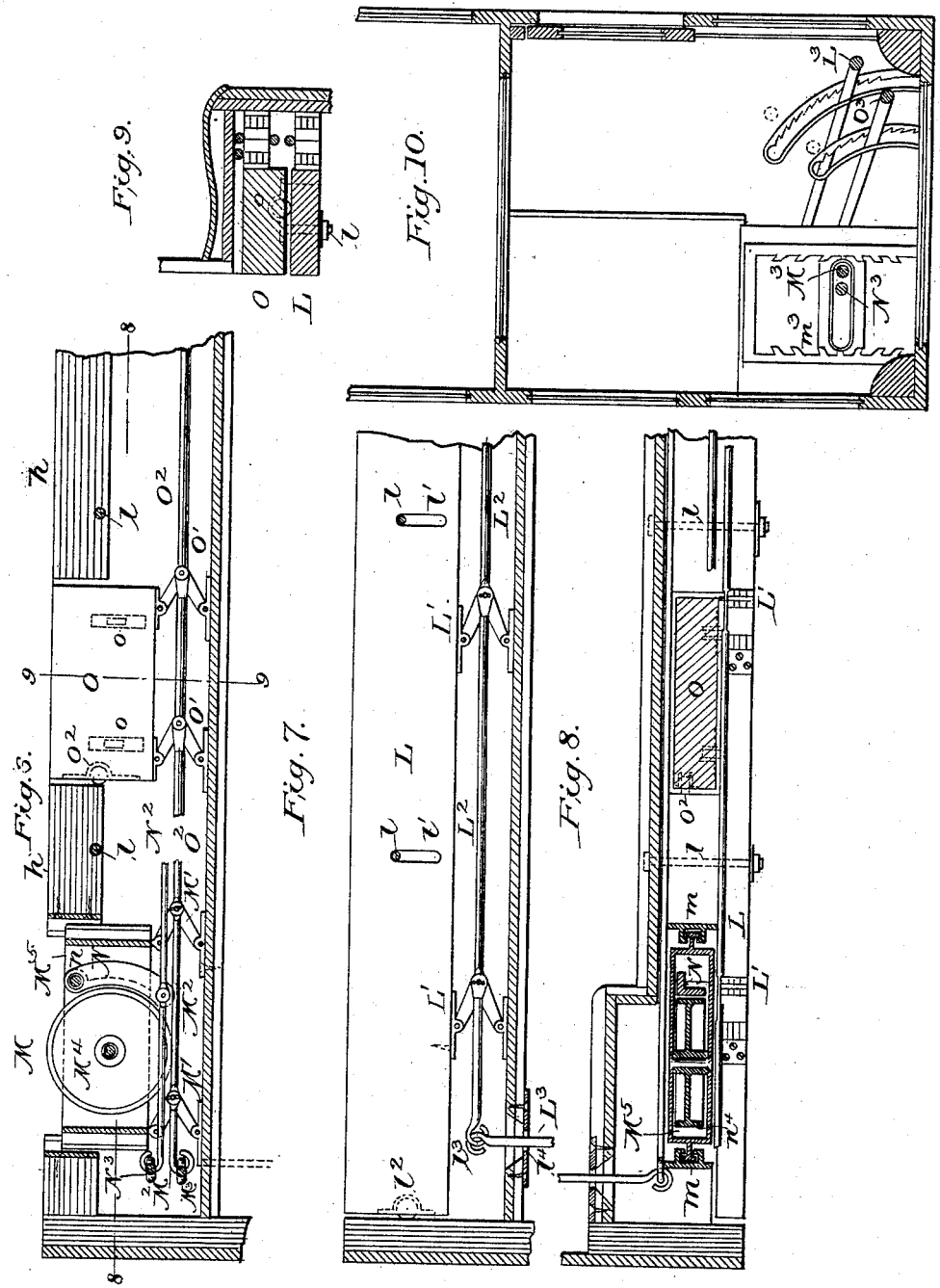
Witnesses:
Inventor.

(No Model.) 7 Sheets—Sheet 5.
L. F. COOK.
TRANSPORTATION SYSTEM.
No. 482,469. Patented Sept. 13, 1892.
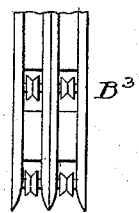
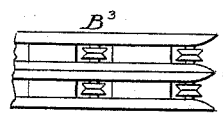 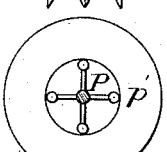 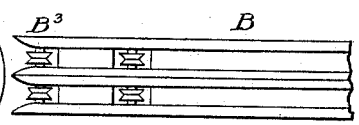
Fig. 11.
Fig. 13.
Fig. 14.
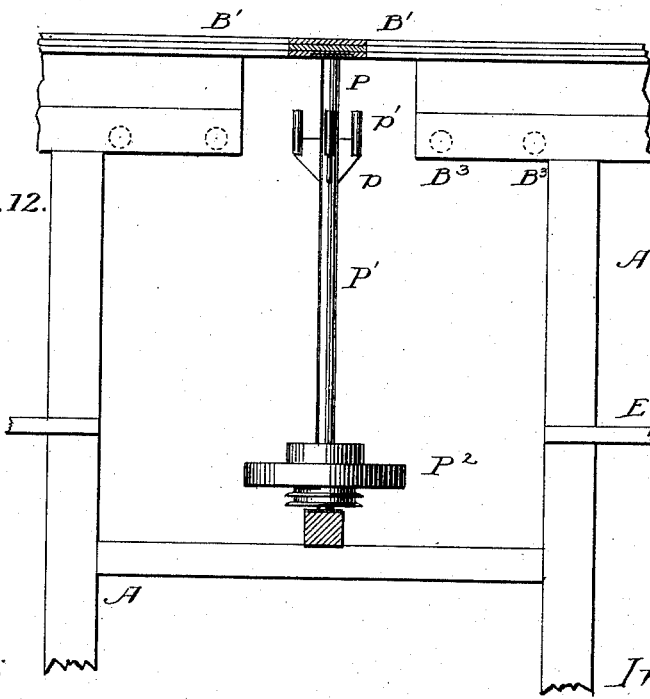
Fig. 12.
Witnesses: Inventor:
T. C. Tipton Lucian F. Cook
Alx Scott (No Model.) 7 Sheets—Sheet 6.
L. F. COOK.
TRANSPORTATION SYSTEM.
No. 482,469. Patented Sept. 13, 1892.
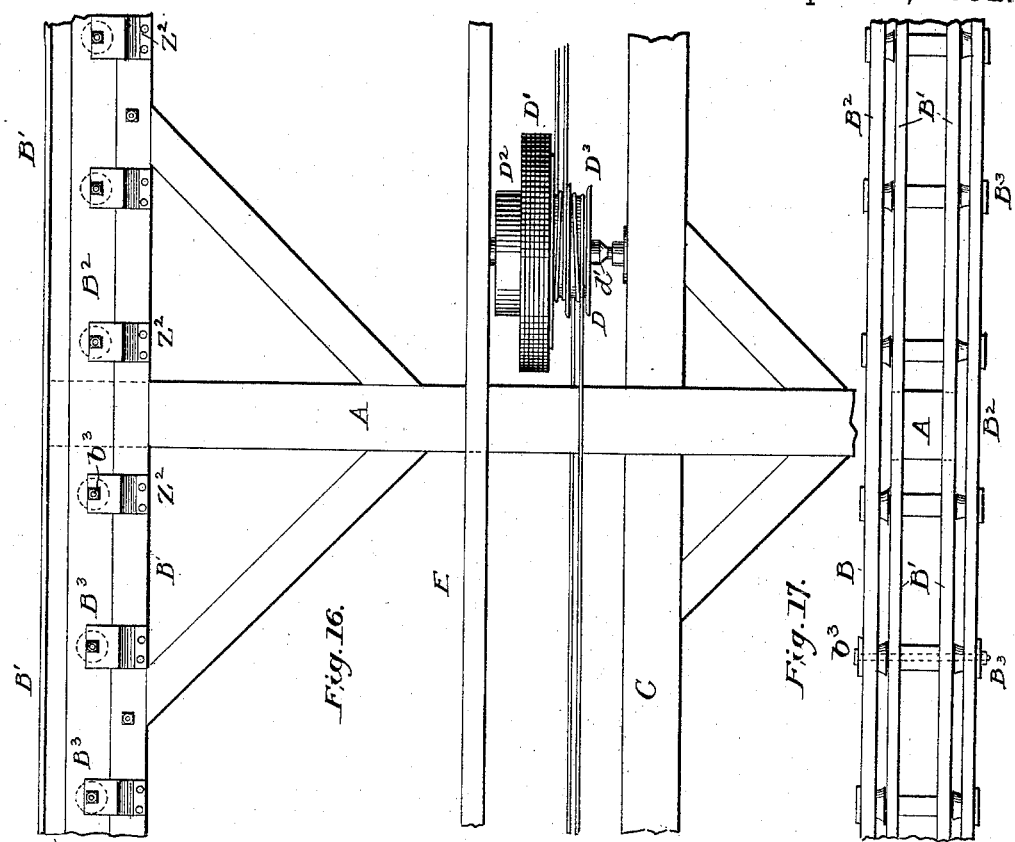
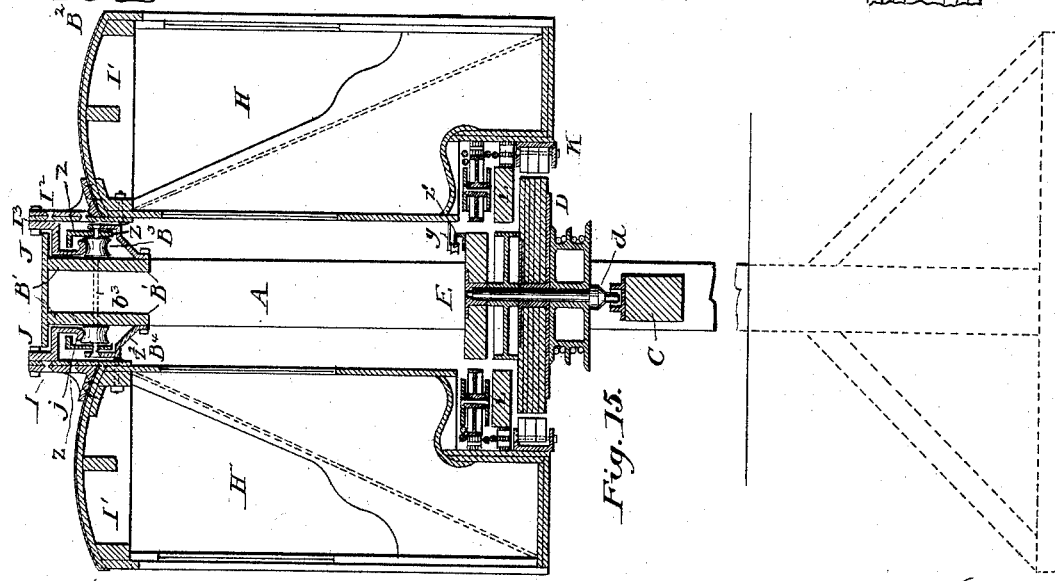
Witnesses:
T. C. Tipton.
Aly. Scott.
Inventor:
Lucian F. Cook.

(No Model.) 7 Sheets—Sheet 7.
L. F. COOK.
TRANSPORTATION SYSTEM.
No. 482,469. Patented Sept. 13, 1892.
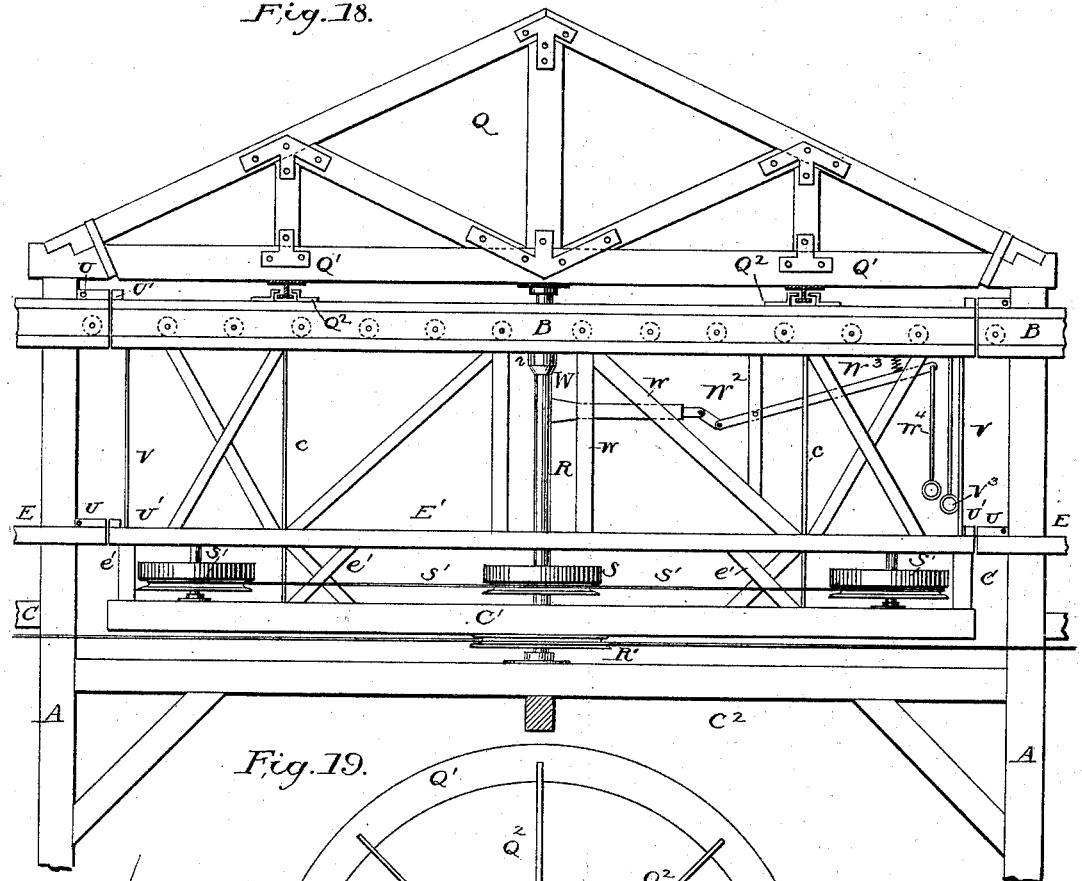
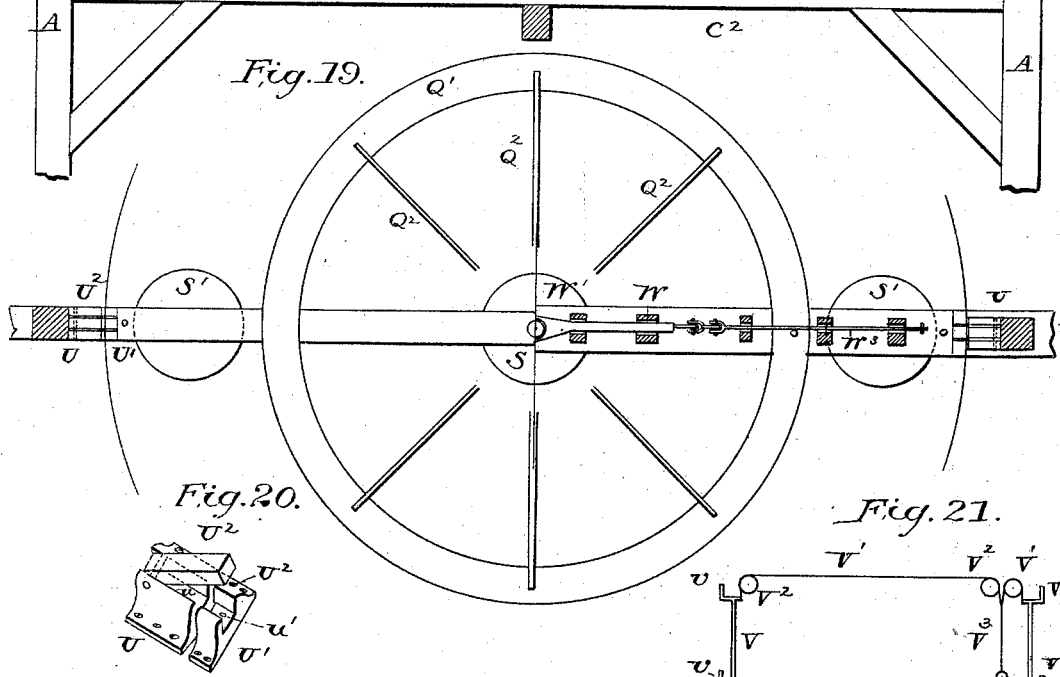
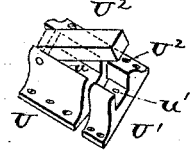
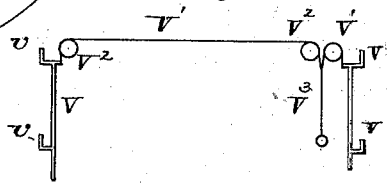
Witnesses:
T. C. Tipton
Alex. Scott
Inventor:
Lucian F. Cook
THE NORRIS PETERS CO., PHOTO-LITHO., WASHINGTON, D. C.

UNITED STATES PATENT OFFICE.

LUCIAN F. COOK, OF TACOMA, WASHINGTON.

TRANSPORTATION SYSTEM.

SPECIFICATION forming part of Letters Patent No. 482,469, dated September 13, 1892.

Application filed January 5, 1892. Serial No. 417,122. (No model.)

*To all whom it may concern:*

Be it known that I, LUCIAN F. COOK, a citizen of the United States, and a resident of Tacoma, Pierce county, Washington, have invented certain new and useful Improvements in Transportation Systems, of which the following is a specification, reference being made to the accompanying drawings, in which—

Figure 1 is a transverse section of the track, cars, and driving mechanism on line 1 1, Fig. 4. Fig. 2 is a longitudinal horizontal section of the car, on a reduced scale, to show its general plan. Fig. 3 is a top view of the track structure, the cover-section being removed. Fig. 4 is a side view of the track structure, showing a car on the side opposite the spectator. The outside flange upon the near track is taken away for clearness of illustration. Fig. 5 is a side view, on a smaller scale, of those parts shown in Fig. 4. Fig. 6 is a sectional plan view on line 6 6 of Fig. 1, showing the wheel-brakes and the "safety-brakes." Fig. 7 is a sectional plan view on the line 7 7 of Fig. 1 of the "starting-beam." Fig. 8 is a longitudinal vertical section on line 8 8 of Fig. 6. Fig. 9 is a transverse section on line 9 9 of Fig. 6. Fig. 10 is a plan view, partly in section, of the driver's compartment, showing the levers for manipulating the various brakes and the starting mechanism. Fig. 11 is a plan view of one form of crossing, and Fig. 12 is a side view of the same. Fig. 13 is a side view of the traveling hanger-beam, and Fig. 14 is a top view of the same.

My invention relates to a system for the rapid transportation of passengers, merchandise, and freight of various kinds, whereby the rolling-stock may be of greatly-decreased weight as compared with that used on present roads, the elevated structure carrying the cars in consequence being of less size and of less cost in comparison to the work done, and whereby the cars may be driven at a much greater speed with substantially the same expenditure of power, thus reducing the ratio of paying to non-paying or "dead" load.

My invention consists, broadly, in cars suspended off their center of gravity and driven by a series of stationary revolving drive-wheels acting against the said cars, and in devices for accomplishing this object to be more specifically described and claimed.

The letter A indicates a series of columns or posts of any suitable material or form, as may be found most advantageous under particular circumstances, though in most of the figures I have shown them as made of wood. These columns support tracks B and beams or girders C, which last run from column to column. On these beams C are placed bearings $d'$, at a suitable distance apart, in which the lower ends of shafts $d$, which carry the drive-wheels D', are mounted and revolve. The particular construction of these drive-wheels will be more fully described hereinafter. The upper ends of the shafts $d$ revolve in bearings in an upper longitudinal beam or girder E, which, as shown, is wider than the posts A, and which not only performs the function of supporting the journal of shaft $d$, but also acts as a face against which brakes upon the car take, as hereinafter described. I shall term this the "longitudinal" brake-beam hereinafter.

Upon the columns A are supported tracks B, running in the same direction as the series of columns.

I have shown my construction in Figs. 1, 3, 4, 5, 11, 12, 13, and 14 as built of wood, with a central built-up beam B' forming the division between the up and down tracks and two outside beams or flanges B². These three beams are spaced apart by blocks $b^2$, (see Fig. 4,) placed at short intervals. Between blocks $b^2$ are antifriction-rollers B³, which revolve on bolt-bearings $b^3$, the bolts $b^3$ passing entirely through the two tracks, thus securely and rigidly holding the beams B' B² B² together, and also affording a bearing for the rollers B³ of such track. The beams at the holes through which the bolts pass are further strengthened by plates of metal let into the wood, as shown at $b^4$, Fig. 1, thus distributing the shearing strain of the bolts. Of course any other suitable means of journaling the rollers B³ may be adopted, if desired.

On the top of beam B' is a cap or cover $b'$, designed to protect the tracks from rain, snow, or dust, and also to prevent the car from jumping the track, as hereinafter described. This cover might be made wide enough to admit of a man walking therein and oiling the rollers $B^3$ or other parts. The entire track thus constructed resembles a continuous covered trough open at one side and whose bottom is formed of alternate antifriction-rollers and spacing-blocks.

The letter D indicates the driving mechanism as a whole, $d$ being vertical shafts revolving in bearings $d'$ $d^2$ in the upper and lower beams C E. Upon each shaft is keyed a pulley-wheel $D^3$, a friction drive-wheel $D'$, and a smaller drive-wheel called the "starting-wheel" $D^2$. These several pulley and drive wheels may be constructed in any desired manner, but preferably as follows: The pulley-wheel $D^3$ is cast in one piece, with a horizontal flange $d^3$ in the middle and an upper and a lower flange, thus making two grooves, in which the power-receiving and the power-transmitting cables are carried, as shown more clearly in Figs. 4 and 5. The upper flange $d^4$ is larger than the lower flanges, and to it the successive layers of wood or composition which forms the drive-wheel $D'$ are bolted. (See Fig. 1.) These layers or sections of wood are rigidly clamped and held between a flanged sleeve $d^6$ and the web of flange $d^4$, the two flanges or plates $d^4$ $d^6$ being drawn together by bolts and nuts, as shown. The wheel $D'$ is built up of layers of wood the grain of which runs outwardly from the center of the wheel, the face of the wheel thus being formed of wood cut across the grain. While this is what I now consider the best mode, the wheel may be faced with leather or rubber or be made of paper or other composition, as may be found best adapted to the exigencies of the occasion.

Above the main drive-wheel $D'$ is what I call a "starting" or "half-speed" drive-wheel $D^2$ of less diameter than wheel $D'$—as shown, one-half. This wheel is keyed to shaft $d$, and of course its circumference moves at a speed proportionate to the difference in diameter between it and the main wheel $D'$. It is used, as its name indicates, for driving the car at half-speed; but the prime object of it is to start the car by means hereinafter to be described. The face of this wheel, as also that of wheel $D'$, may be roughened or corrugated. The wheel $D^2$ may be constructed in any ordinary manner and may be separate, as shown, or rigidly connected to wheel $D'$.

At that point in the system where power is taken from the power-house there is keyed to the lower end of shaft $d$ another grooved pulley-wheel $D^4$, around which the prime power-cable $F'$ from the power-house passes.

From pulley $D^3$ to pulley $D^3$ pass the small cables F, whereby power and motion are communicated from wheel to wheel of the series or train. The drive-wheels are placed apart a distance less than the length of a car, so that the car is always being driven by at least one wheel.

Midway between the drive-wheels $D'$ are what may be termed "guide" or "balance" wheels G, which are "dead-wheels" and merely prevent the car from sagging inward. Of course these wheels may be dispensed with and their place taken by the regular drive-wheels, if found necessary. This completes the description of the general construction of my way or track structure, and it only remains to say that it may be braced in any manner desired. Modifications will be described hereinafter.

The cars H, which are designed to run upon and are peculiarly adapted to this track, are made of any light strong material, such as thin sheet-steel, aluminum, or even paper, and, as shown, are divided into compartments intended to hold two or more passengers, the seats in which are lengthwise of the car, facing from the track structure. Sliding doors H' give access to the structure, and these may be worked from the driver's cab or compartment, as described farther on, by any of the ordinary door-operating devices. None of these arrangements are, however, essential parts of my invention and may be changed as convenience may dictate.

The cars are supported from the track by hangers I I, which may be variously constructed, but which, as shown in Figs. 1, 4, and 5, are curved beams of I shape passing through the car, where they expand, as at $i$, and are bent around and bolted to transverse beams I'. At its upper end the hanger is connected rigidly to a traveling beam J by flanged plates $i'$, bolted securely to the beam J and hanger, as shown in Figs. 1 and 4. Traveling beam J is shown more in detail in Figs. 13 and 14, where is shown one-half of the beam and the rollers $J'$ $J^2$ at one end. These rollers are to lessen the friction between the sides of the track and the beam, and the rollers $J^2$ perform the same function in case the beam should jump or rise to the cover-plate $b'$. The relative position of the track, the hanger, and the car is such that the constant tendency of the car is to swing inward by force of gravity, and consequently the force with which the car bears against the drive-wheels is directly proportionate to this tendency. The lower part of the car under the seats is cut away to leave room for the bearings against which the wheels $D'$ $D^2$ operate and for the slowing, starting, and stopping mechanism now to be described.

The bearing K, against which the main friction drive-wheel $D'$ takes, is formed of beams or planks placed horizontally one upon the other and rigidly held to form one piece in a flange-frame $k$ by bolts and nuts; or it may be formed of metal or other suitable materials. This bearing-face K runs the entire length of the car and is solidly connected to it.

In order to slow down or to retard or to positively stop the movement of the car, there are provided what may be termed a "starting-beam" L, a "wheel-beam" M, and a "block" or "safety" brake N. (Illustrated in Figs. 1, 6, 7, 8, 9, and 10.) It is necessary, of course, in order to prevent the car from moving, that it be held from contact with drive-wheel D', and in order to accomplish this I provide two or more wheels which through certain instrumentalities are pushed out from the car against the longitudinal stationary brake-beam E, before referred to, and hold the car out from the drive-wheels. In Figs. 1, 6, and 8, $M^4$ indicates a wheel of ordinary form and construction, which is journaled in a boxing $M^5$, provided with +-guides at each end, which are capable of sliding in the guides $m$, securely held at the ends of the opening in car-walls, through which the boxing $M^5$ moves. The boxing is connected at each end to toggle-levers M', which in turn are connected to a rod $M^2$, which is moved by a hand-lever $M^3$ in the driver's compartment, as hereinafter described. When the rod $M^2$ is pulled to the left in Fig. 6, the toggle-levers are forced open and the box, the width of which is not quite the diameter of the wheel, slides out beyond the side of the car, forcing the wheel $M^4$ against the longitudinal brake-beam E, as before stated and holding the car from contact with the drive-wheel. It will be understood that were nothing but these wheels used the car when raised from the drive-wheels would run upon them and beam E until its momentum was exhausted. To stop the car, therefore, I provide brakes bearing against the wheels $M^4$. As illustrated in Figs. 6 and 8, N is a brake-lock of angle-iron, pivoted at its outer end $n$ to the wheel-boxing $M^5$ and connected at its inner end to a rod $N^2$, jointed loosely to a hand-lever $N^3$, which projects into the driver's cab. By these means when the car is forced away from D' and is traveling upon wheels $M^4$ brakes N may be brought into action against wheels $M^4$ to impede their motion. This system of braking it is thought will be sufficient for ordinary occasions; but there is provided in addition to that an additional or safety-brake. This consists of a block O, connected to toggle-levers O', the levers O' being opened and closed by a rod $O^2$, loosely jointed to a hand-lever $O^3$ in the driver's compartment. The block-brake O rests on rollers $o$ on the half-speed bearing-face or starting-beam L, to be hereinafter described, and in its ends are mounted other rollers $o^2$, which bear against the end walls of the opening in which the block moves. These rollers $o$ $o^2$ allow block O to move in and out comparatively without friction. Whenever it is desired to stop suddenly or when the brakes N are out of order, the rod $O^2$ is pulled by the driver, the toggle-levers O' opened, and the block O is forced out against the longitudinal brake-beam E. It will be understood that when the car is at a standstill it is held out from drive-wheel D' and rests upon wheels $M^4$, and that when it is desired to start up the said wheels are gradually moved inward and the car swings toward its center of gravity until it bears upon the driving-wheels $D^2$ or D'.

It would be difficult, if not impossible, to start the car from a stop to full speed, and it is necessary to provide means whereby the half-speed friction-wheel $D^2$ may be first brought into action against the car to give it impetus before the large main drive-wheel acts. The mechanism devised by me for this purpose consists of a long beam L, running the length of the car and being guided in its motion out and in by means of slots $l'$ and guiding-bolts $l$. (See particularly Fig. 7.) The bolts $l$ pass through filling-pieces $h$ in the car-framing between the openings for wheels $m$ and block O, and, depending below such filling-pieces, pass through the slots $l'$ in L and support said beam L. At the ends of the beam are friction-rollers $l^2$, bearing against the end walls of the car to guide the beam. The beam L is moved inward and outward by means of a series of toggle-levers L' L', connected by rule or knuckle joints to a longitudinal rod $L^2$, connected in its turn by a loose joint $l^3$ to a hand-lever $L^3$, passing through a metal-faced bearing or fulcrum at $l^4$ into the driver's compartment, as hereinafter described. If the car is at rest, for instance, as above described, and it is desired to start, the bearing or starting beam L is moved outward until it comes in contact with the small drive-wheel $D^2$. The wheels M are then moved back to their usual position and the car is moved at a comparatively low rate of speed. When sufficient impetus has been given the car, the beam L is moved inward and the car allowed to swing inward until the fixed bearing K rests against the main drive-wheel D', when full speed is given it. The reverse of the starting operation may be used to stop, or the action of the brakes may alone be relied on. The arrangement of the hand-levers connected with these various mechanisms and their position in the driver's cab or compartment is shown in Figs. 1 and 10. I have employed toggle-levers to move the wheels, blocks, and beams inward and outward, first, because the power exerted by them is much greater relatively to the force expended to move them, and, secondly, it requires but little strength to hold them rigid in their open position when the greatest strain is brought upon them. The use of toggle-levers, however, necessitates a peculiar construction of the fulcrum or bearing plates of the hand-levers $L^3$, $M^3$, $N^3$, and $O^3$, consequent upon the sidewise motion of the rods $L^2$, $M^2$, $N^2$, and $O^2$, when the toggle-levers connected therewith are opened or shut. Thus the upright levers $M^3 N^3$ pass through a transversely-slotted metal plate $m^3$, which admits of the sidewise play of the levers. The levers $L^3$ $O^3$, however, pass through openings in a plate $l^4$, as the said sidewise motion of rods $L^2$ and $O^2$ merely slips the rods in and out. While I have shown this construction, I do not wish to be limited thereto, as any means may be used to take up this play, as is well known.

Suitable pawls and ratchets may be used to hold the levers in any position, and detailed reference to them is unnecessary, as they are well known. I have indicated them, however, in Fig. 10.

It is obvious that many different means might be used to move the starting-beam L or wheel M or brake-block O outwardly besides those shown. For instance, the beam L might have an inclined inner face acting against an oppositely-inclined-faced beam movable longitudinally on the car in the manner of two wedges, so that when said inner beam was moved it would push out the beam L, or it might move on pins working in diagonal slots. These are merely suggestions of various mechanical movements which might be applied to any or all of the mechanism without departing from the spirit of my invention.

In connection with the timber construction heretofore described I will now describe a form of crossing devised by me and shown in Figs. 11 and 12, merely premising, however, that the principles thereof may be adapted to any of the modifications in construction to be hereinafter described. The two lines of track B are constructed as usual, except that they are cut away at their intersection to an extent sufficient to leave a space between the end of the tracks and the frog-piece P just large enough for the passage of the car-hangers I. The upper end of the post P' is supported by extensions of the cap or cover b', securely fastened together, the lower end being set in a transverse beam or any suitable support upon the columns, as shown. The frog-piece shown consists of four ratchets $p$, supporting guide-pieces $p'$. On the post or shaft P' is a dead-wheel $P^2$, capable of rotating and constructed substantially as are the dead or balance wheels and performing the same function. The wheel $P^2$, being placed at the center of the four tracks, is a balance-wheel for cars upon all the tracks.

Having described the construction, I will now describe the general mode of operating my system. It is intended that the line of columns should support at its upper end two lines of tracks, one for the "up" trains and one for the "down," and one line of drive-wheels being placed in the center will drive both. The drive-wheels are driven by cables. As shown, a series of short separate endless cables are used for each two pulleys; but it is obvious that any system of transferring power could be used. At suitable distances are located power-houses, from which large cables convey power to the train of drive-wheels in its section. The speed of the drive-wheels depends upon the initial speed and the size of the pulley-wheels $D^3$ and that of the cars upon these elements and the size of the drive-wheels. It is obvious that great speed may be obtained by "gearing up" and by enlarging the drive-wheels. The cars are stopped, started, slowed down, &c., as described before. The roughening of the face of the auxiliary drive-wheel $D^3$ materially aids in overcoming the inertia of the car in starting.

Electricity, water-power, pneumatic, or other power may be used to run the lines of shafting, and electricity might be taken from a wire carried in the track to light the car or for telephonic or telegraphic purposes. I intend, also, to use some system of block signaling to prevent all danger of accident.

In case the cars should not bear with sufficient friction against the drive-wheels I provide rails or bars—such as Z', for instance—placed upon the brake-beam or some other convenient part of the structure. I also provide a rod or projection or a series thereof extending out from the car, as shown at Y, and which carries a wheel or wheels, as $Y^2$, which bears against the said rail or bar and through suitable connections from said device Y, leading to the conductor's apartment. They are actuated to draw the car against the drive-wheels. I have shown the connections to consist of a toggle-lever $Y^4$ and connecting-rod Y'. A spring (shown at $Y^5$) tends to keep the wheel $Y^2$ normally in contact with the rail. To increase the pressure against the rail, and consequently the pressure of the car against the drive-wheels, the lever $Y^3$ is operated to straighten the toggles $Y^4$.

The modified form of my track and hanger is illustrated in Figs. 15, 16, and 17, which are respectively a cross-section, a side view, and a plan. The driving mechanism and the cars, except as regards the hangers, are of the same construction as before described. The simplified track consists of beams B', running on the outside of the posts. The antifriction-rollers $B^3$ are supported by brackets $Z^2$ and bolt-rods $b^3$, which pass entirely through the bracket and beams to the outside of the bracket upon the opposite side of the track, as shown in Fig. 15, the bolt thus not only acting as a bearing for two antifriction-wheels, but also binding and supporting the brackets, wheels, beams, and posts or columns rigidly together. Between the wheels $B^3$ and the bracket $B^4$ is supported upon the bolt-rods $b^3$ a longitudinal guard-beam Z, with an upper inwardly-bent flange. The said guard-beam projects a distance above the wheels $B^3$, and the flange projects inwardly to about the middle of the wheels. Between the posts the tie or bolt rods pass through filling-sleeves, (see Fig. 17,) which fill the space between the beams B' B'. The hanger used with this construction consists of two plates of metal $I^2 I^3$ of the length of the car and riveted together, and at its upper side provided with a ⌐-shaped runner J. The outside plate $i^2$ is flanged at its lower end, as shown, and is by this flange and screws or bolts securely connected to the top of the car. The inside plate $i^3$ is flat and extends below plate I, and is bolted to the side of the car. At the upper edge of these two plates there is bolted a ⌐- shaped beam J, whose lower edge has an inwardly-projecting flange or shoe $j$ round on its lower face to fit the roller $B^3$. The flange forming the shoe $j$ when in position rests upon the rollers $B^3$ and under the flange on beam Z.

I have lettered the modifications as nearly as possible to the analogous parts in the other figures. Thus the beam Z in Fig. 15 corresponds in a degree with beam $B^2$ in Fig. 1, &c., in that it acts as a guide, and the flange on its upper edge performs the functions of the cover-plate $b'$.

Figs. 18, 19, 20, and 21 illustrate a form of turn-table or switch for my system, the track construction being the same as last referred to. Fig. 18 is a side view; Fig. 19, a plan, partly in section; Figs. 20 and 21, details.

A are the posts or columns; B, the track structure; C', the lower beams supporting the drive-wheels, and E' the longitudinal brake-beam. In general it may be said that this switch or turn-table is composed of a section of track supported at its center by a pivot hanging from a bridging-truss and by a circular track or guide, thus forming a suspended turn-table.

Q indicates an ordinary form of truss supported at both ends by the posts or columns A. Fast to the under side of this bridge-piece is a circular track Q' of T shape, held in position by radiating tie-rods $Q^2$, which are fastened at their upper ends to the upper part of truss Q. The circular track may also be supported by a beam (not shown) at right angles to the truss Q and on a level with its lower member, and its outer ends resting on posts or columns.

R is a shaft whose upper bearing is in the center of truss Q and whose lower bearing is in a beam $C^2$, running from post to post beneath the swinging or turning track structure. This shaft R passes loosely through the track B and the beams C' E'.

Between the brake-beam E' and the beam C' is keyed to the shaft the friction drive-wheel S with a cable-groove. The beam C', which corresponds to the beam C on the main track, is supported at its ends from the swinging track B by suitable rods $c\,c$, and the upper longitudinal brake-beam E' rests on blocks and bracing-pieces $e'$ between it and lower beam C'. Between and at the extremities of beams C' E' are drive-wheels S' S', like wheel S, driven from S by short cables $s'$. Suitable trussing is used between the track B and E' C' to make the whole structure rigid. To the upper side of the track B are fastened ⌐-shaped guiding-cleats $Q^2$, which fit the flanged head of circle or track Q' and support the track structure from Q', which is analogous to the "fifth-wheel" of a wagon.

In order to hold this turn-table or switch rigidly to whatever track it may be turned, I have devised a latch. (Shown in detail in Fig. 20.) The part U of the latch is on the main-track structure, as shown in Fig. 18, and it is provided with the outside flanges, forming a central groove $u$, in which is pivoted the bar $U^2$, which is designed to drop into the groove $u'$, formed by flanges $u^2\,u^2$ on part U', these flanges having inclined outside faces. Projecting through a vertical hole in piece U' is a pin $v$ on a rod V. (Shown in Fig. 21.) There are two of these rods V, one on each end of the turn-table or switch, and there are four latches U', one on each end of the brake-beam E' and on each end of the track, and therefore there are on each rod V two pins $v$. The rods V V slide up and down in vertical holes in B and E' and are moved by cords $v'\,v'$, passing over rollers or pulleys $v^2\,v^2\,v^2$, arranged, as shown, so that when the handle $V^3$ on cords $v'\,v'$ is pulled both rods will be pulled upward simultaneously, and the pin $v$, rising through the hole in U', will lift the hinged bar $U^2$ clear of the sides of groove in U', permitting the table or switch to be turned on its pivotal connection.

The means for turning the switch or table is as follows: W is a sliding bar carrying what I term a "clutch" at the end nearest to the shaft R. This clutch, as shown, consists merely of an enlargement of the bar, the end of said enlargement having a concave and preferably roughened face to fit the shaft R. The bar W slides through holes in the bracing-timbers $w\,w$, and is at its outer end connected by a link $W^2$ to a lever $W^3$, pivoted to timber $w^2$. This lever projects out to the end of the track and from it depends a pulley $W^4$.

While I have shown a certain form of clutch and arrangement of levers, I do not wish to be limited thereto, as any other form of clutch or any combination of levers may be used whereby the turn-table or switch may be connected to or disconnected from the revolving shaft R.

In order to prevent the sliding clutch-carrying bar from jamming in the holes through timbers $w\,w$, antifriction-rollers may be used or any other well-known antifriction devices.

It will be noticed that the pull for the clutch and the pull whereby the latch-bar $U^2$ is raised are in proximity to each other, so that both operations may be performed at the same place. It will be clearly seen that, if necessary, I can duplicate the clutch and latch raising devices so that they may be operated from both ends of the table.

In operation cars are run upon the turn-table or switch, the cars being raised from the drive-wheel, as before described. Then the driver pulls upon the cord $V^2$ and raises the hinged bars $U^2$ out of their seats. The clutch-pull is then operated to throw the clutch against the shaft R, whereby the turn-table or switch structure is connected and moves with shaft R. As soon as the hinged bar $U^2$ has moved beyond the flanges on piece U' it drops by its own gravity. When the part U' reaches the catch on the next track, the bar $U^2$ will be forced upward by means of the inclined face of the flanges $u^2$, and will drop into position in the recess, securely locking the turn-table to the next track. Spring-latches may be used in place of these gravity-latches without departing from the spirit of my invention. As soon as the turn-table is locked, the cars are lowered, as before described, until they touch the driving-wheels S S' S', when they are driven off the table and on their way.

I have shown my device as a turn-table with double tracks to simply turn the cars around; but it may be used as a switch to shunt the cars to any track radiating from the pivotal center. I may also with slight modifications have two lines of tracks at right angles to each other, so that the turn-table becomes a crossing-frog, as before described, and a turn-table; but this I have not shown. The power-wheel R', as illustrated, is of larger diameter than the pulley-wheels $D^3$ on the main track, so that the shaft R moves at a much lower rate of speed than the shafts $d$ on the main line.

It is not intended that the driver in turning the table shall hold the clutch continuously to the shaft R, but put it on and off, as is required, to slowly move the table. To the end that the clutch shall not by any inadvertence be kept on, I may provide a spring to pull the clutch away from the shaft.

What I claim is—

1. In a transportation system, the combination of cars suspended off of their center of gravity, with horizontal propeller-wheels against which said cars bear, and means for increasing the friction of the cars against their propelling-wheels at the pleasure of the attendant, all substantially as shown and described.

2. In a transportation system, a line of friction drive-wheels driven by suitable mechanism, and an up and a down track, the cars on which are adapted to be driven, the up cars by one side of said wheels and the down cars by the other, combined with cars suspended off their centers of gravity and means for forcing said cars against their drive-wheels when desired, substantially as described.

3. In a transportation system, a car hanging from an upper track and a line of friction drive-wheels acting against the said car to move the same, and mechanism whereby said wheels are driven, substantially as set forth.

4. In a transportation system, a car hung from an upper track and friction drive-wheels bearing and acting against the side of said car, the car being so hung that the action of gravitation will force and hold it against the friction-wheels, and mechanism for driving the wheels, substantially as described.

5. In a transportation system, a car hanging from an upper track and friction drive-wheels bearing against the sides of the car, the car being hung from a point at one side of its center of gravity, so that it will tend to swing and bear against said drive-wheels and be driven by them, as described and shown.

6. In a transportation system, a series of columns supporting tracks, antifriction roller-bearings on such tracks, rotating friction drive-wheels supported by said columns, mechanism for rotating said wheels, and cars adapted to bear against said wheels and be moved by them and supported from a beam or bar adapted to travel on said roller-bearings in the track, substantially as described.

7. In a transportation system, a series of columns supporting tracks, friction drive-wheels supported by said columns, mechanism for rotating said wheels, a longitudinal fixed brake-beam running from column to column, and a car adapted to take against the drive-wheels, and a brake upon the car, acting against the said brake-beam, substantially as described.

8. In a transportation system, tracks and cars designed to run upon said tracks, in combination with two sets of friction drive-wheels, one set being of smaller diameter than the other, and means whereby the car may be connected to or disconnected from one or the other of said wheels as it is desired to hasten or diminish the speed, substantially as set forth.

9. In a transportation system, tracks and cars designed to run upon said tracks, in combination with a series of shafts, each shaft carrying two or more friction drive-wheels of different diameters, and means whereby the cars may be connected to or disconnected from one or the other of said wheels to increase or diminish its speed, substantially as described.

10. In a transportation system, tracks and cars designed to run upon said tracks, in combination with a series of shafts, each shaft carrying two friction drive-wheels of different diameters, having their surfaces roughened, bearing-faces on said cars against which the wheels act, and mechanism by which the cars may be connected with or disconnected from said wheels, substantially as described.

11. In a transportation system, a line of horizontal friction drive-wheels driven by suitable mechanism, cars adapted to bear against said drive-wheels, and means whereby the cars may be forced laterally away from said wheels in order to stop, substantially as described.

12. In a transportation system, a line of posts or columns carrying a longitudinal brake-beam, a line of friction drive-wheels driven by suitable mechanism, cars adapted to bear against said drive-wheels, a series of wheels mounted upon the car, and means for forcing said wheels against the longitudinal brake-beam on the posts or columns, whereby the car is forced from the drive-wheels, for the purpose hereinbefore described.

13. In a transportation system, a line of friction drive-wheels driven by suitable mechanism, cars adapted to bear against said drive-wheels, posts supporting said drive-wheels, and a longitudinal brake-beam upon said posts, in combination with wheels mounted in a suitable boxing or frame, tracks on which the boxing or frame slides, and toggle-levers connected with said frame and with mechanism for moving them, substantially as described and shown.

14. In a transportation system, a line of friction drive-wheels driven by suitable mechanism, cars adapted to bear against said drive-wheels, posts supporting said drive-wheels, and a longitudinal brake-beam upon said posts, in combination with a series of wheels movable inwardly and outwardly upon the car to bear against the said brake-beam and brakes acting against said wheels, substantially as described.

15. In a transportation system, a line of friction drive-wheels driven by suitable mechanism, cars adapted to bear against said drive-wheels, posts or columns supporting the drive-wheels, and a longitudinal brake-beam upon said posts, in combination with a series of wheels mounted in sliding frames or boxes movable inwardly and outwardly upon the car and brakes pivoted at one end to the box or frame and connected at the other to a rod and hand-lever or equivalent mechanism, substantially as described.

16. In a transportation system, a line of friction drive-wheels driven by suitable mechanism, cars adapted to bear against said drive-wheels, posts supporting said drive-wheels, and a longitudinal brake-beam upon said posts, in combination with a series of wheels mounted to move outward and inward against the brake-beam, brakes acting against said wheels, and supplemental or safety brakes acting against the brake-beam, substantially as described and shown.

17. In a transportation system, a line of friction drive-wheels driven by suitable mechanism, cars adapted to bear against the said drive-wheels, posts supporting said drive-wheels, and a longitudinal brake-beam upon said posts, in combination with mechanism for forcing the car away from the drive-wheels and a brake upon the car movable toward and acting against the said longitudinal brake-beam, substantially as described.

18. In a transportation system, a line of friction drive-wheels driven by suitable mechanism, cars adapted to bear against the said drive-wheels, posts supporting said drive-wheels, and a longitudinal brake-beam upon said posts, in combination with brake-wheels adapted to move against the brake-beam aforesaid, brakes acting against said wheels, and supplemental or safety brakes consisting of blocks movable on antifriction-bearings and rods connected to them to move the same, as described.

19. In a transportation system, a series of columns supporting tracks, a series of shafts supported by the columns, friction drive-wheels of different diameters on the shafts, and means for driving the drive-wheels, in combination with a car, a bearing-face against which the large friction drive-wheel bears and acts, and a movable bearing-face for the small drive-wheels, substantially as described.

20. In a transportation system, a series of columns or posts supporting tracks, drive-wheels of different diameters supported on the columns, and means for rotating the drive-wheels, in combination with a car provided with a bearing-face for the larger drive-wheel and a bearing-face for the small drive-wheel, the last being movable out and in by means of toggle-levers and connecting-rods, as described.

21. In a transportation system, a series of columns or posts supporting tracks, drive-wheels of different diameters supported on the posts, and mechanism for rotating said drive-wheels, in combination with a car provided with a fixed longitudinal bearing-face against which the large drive-wheel bears, and a movable bearing-face formed of a longitudinal beam, transverse slots in said beam, bolts passed through the car-frame and through the said slots to support the said beam, and means for moving said beam to and from the car and against the smaller drive-wheel, substantially as described.

22. In a transportation system, a series of columns supporting tracks, a series of shafts supported by the columns, two or more friction drive-wheels of different diameters upon each of said shafts, means for driving said friction-wheels, and a longitudinal fixed brake-beam from column to column, in combination with a car provided with a series of movable wheels adapted to be moved against the brake-beam to force the car out from the drive-wheels, a brake, a fixed bearing-face for the larger drive-wheels, and an outward and inward movable beam forming a bearing-face for the smaller drive-wheels, all substantially as described and shown.

23. In a transportation system having a line of posts or columns supporting friction drive-wheels, the combination, with an overhead track consisting of a longitudinal partition separating the up and down tracks, outside longitudinal guiding-beams, and antifriction-rollers between the partition and said beams, of a car suspended by means of hangers from a runner traveling upon said rollers, substantially as set forth.

24. In a transportation system having a line of posts or columns supporting friction drive-wheels, the combination, with an overhead track consisting of a longitudinal partition separating the tracks, outside longitudinal guiding-beams, antifriction-rollers between the partition and the last-said beams, and bolts passing through the beams and partition and forming bearings for the antifriction-rollers, of a car suspended by hangers from a runner designed to travel on such rollers, substantially as set forth and shown.

25. In a transportation system having a line of posts or columns supporting friction drive-wheels, the combination, with an overhead track consisting of a series of antifriction-rollers and guide-beams on which a suspended car travels, of a cover-plate over said track, substantially as described, and for the purposes set forth.

26. A switch or turn-table for transportation systems, consisting of a section of track supported by a circular guide or track and having a longitudinal brake-beam, in combination with a central rotating shaft passing loosely through the tracks and brake-beam and carrying a friction drive-wheel, means for driving said shaft, and a clutch acting between the track structure and the shaft to connect the same, so that the track structure may rotate with the shaft, substantially as described.

27. A switch or turn-table for a transportation system, consisting of a section of the track structure supported by a circular guide or track and having a longitudinal brake-beam, in combination with a central rotating shaft passing loosely through the tracks and brake-beam and carrying a friction drive-wheel, mechanism for driving said wheel, a clutch on the track structure, acting against the central shaft to connect the same, and latches on the main tracks for holding the switch or turn-table in position, substantially as described.

28. A switch or turn-table for a transportation system, consisting of a section of the track structure supported by a circular guide or track and having a longitudinal brake-beam, in combination with a central rotating shaft passing loosely through the tracks and brake-beam and carrying a friction drive-wheel, mechanism for driving said wheel, a clutch on the track structure, acting against said central shaft, latches on the main tracks for holding the switch or turn-table in position, means for connecting and disconnecting said latches, and auxiliary drive-wheels at the ends of the turn-table, connected to the central drive-wheel, substantially as described and shown.

29. The combination, with a switch or turn-table for a transportation system, consisting of a section of the track structure supported by a circular guide or track from a bridging piece or truss spanning the turn-table or switch, a central rotating shaft passing loosely through the track structure, the upper end journaled in the said truss and the lower end journaled in a transverse beam between the columns, a friction drive-wheel on said shaft, auxiliary friction drive-wheels at the ends of the turn-table or switch, driven from the central drive-wheel, the shaft of the central drive-wheel passing below the turn-table, and means for driving said shaft from the drive-shafts on the main lines, of a clutch on the track structure, acting against the said central shaft, a system of levers for moving the clutch, latches on the main-track structure for holding the switch or turn-table in position, and means for connecting and disconnecting said latches from the turn-table or switch, as described and shown.

30. In a turn-table or switch consisting of a swinging section of the track structure, a central shaft passing loosely through the track structure and carrying a drive-wheel, and a clutch on the track structure, acting against the central shaft, the combination, with pivoted latches on the main-track structure and flanged seats for said latches on the turn-table or switch structure, the flanges of said seats having outside inclined faces, of vertical pins passing through the said seat, sliding rods carrying said pins, cords passing over pulleys and connected to the rods, and a pull upon said cords, whereby the pins may be raised and the pivoted latches forced upward from their seats, substantially as described and shown.

LUCIAN F. COOK.

Witnesses:
CLARENCE A. BRODEUR,
CLARENCE E. GRIFFIN.